Feb. 20, 1968  D. T. HAYES  3,369,690
PLASTIC CONTAINER WITH INTEGRAL CARRYING HANDLE
Filed Dec. 28, 1964  2 Sheets-Sheet 1

INVENTOR
DANIEL THOMAS HAYES
BY Robert P. Auber
ATTORNEY

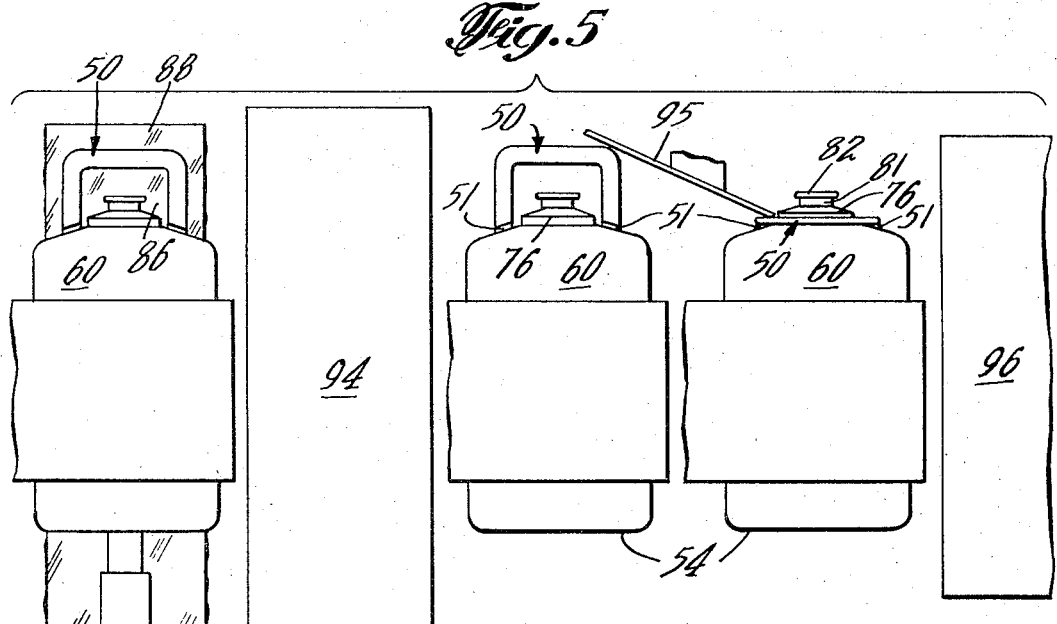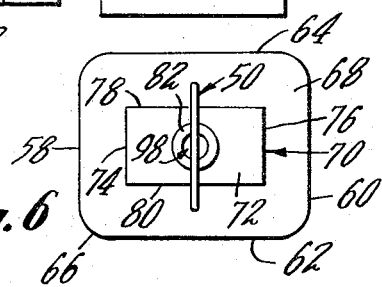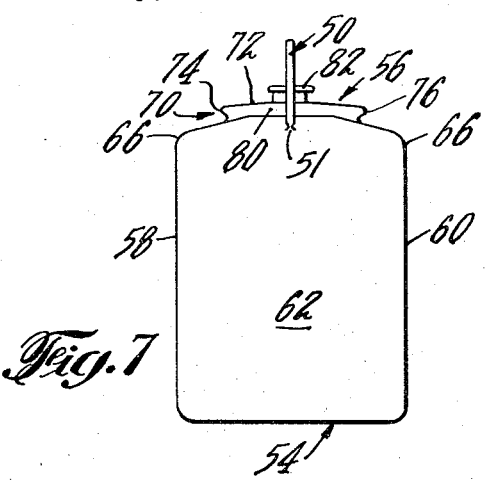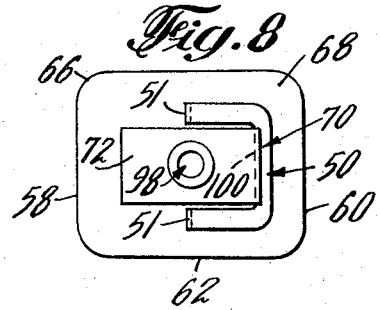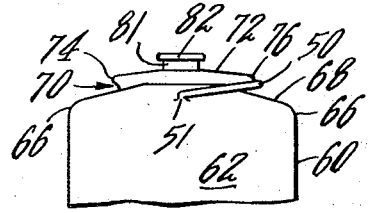

United States Patent Office 3,369,690
Patented Feb. 20, 1968

3,369,690
PLASTIC CONTAINER WITH INTEGRAL
CARRYING HANDLE
Daniel Thomas Hayes, New Canaan, Conn., assignor to American Can Company, New York, N.Y., a corporation of New Jersey
Filed Dec. 28, 1964, Ser. No. 421,273
2 Claims. (Cl. 215—100)

The present invention relates to a blown plastic container. It has particular reference to a blown plastic container and an integral carrying handle therefor and a method of manufacturing same.

In an effort to provide the public with greater convenience, there has been a recent trend in the container industry toward making the handling of retail containers more facile by providing them with carrying handles. To be commercially practical, the carrying handle must be inexpensive to manufacture; it must be sufficiently strong to consistently support a relatively heavy filled container, but at the same time it must be readily movable to facilitate filling of, carrying of or dispensing from the container; it must also be readily retained in a position which does not interfere with the processing or filling of the container. Further, the carrying handle should be inconspicuous.

It is, therefore, an object of the present invention to provide a container and handle which meets all of the requirements set forth above.

Another object is to provide a container having a handle which can be readily locked in a fixed position relative to the container body.

A further object is to provide an integral container and handle construction wherein the handle can be readily retained in a first position until the container is filled, whereupon the handle is readily moved to a carrying or supporting position.

Still a further object is to provide for a plastic container body an integral inconspicuous handle construction which is readily moved to various positions.

Yet another object is to provide a method of manufacturing a plastic container which meets all of the requirements and objects set forth above.

Numerous other objects and advantages of the instant invention will be apparent as it is better understood from the following description, which, taken in conjunction with the accompanying drawings, discloses a preferred embodiment thereof.

The above objects are accomplished by extruding a hollow tubular parison between spaced mold halves which, in their closed positions, form therebetween a cavity, closed at both its upper and lower ends, and an open U-shaped cavity which communicates with the upper end of the closed cavity at two locations, moving the mold halves to the closed position to compress the upper end of the parison within the U-shaped cavity to form a handle and to simultaneously seal each end of the parison, subjecting the interior of the parison to pressurized fluid, to reform the parison into the shape of the closed cavity, opening the mold, removing the formed article from the mold and removing the flash, to thereby form a plastic container and an easily manipulatable, integral carrying handle therefor.

Referring to the drawings:

FIG. 5 is a schematic view illustrating several container-forming steps ot which the formed article is subjected;

FIG. 6 is a top plan view of the completed container;

FIG. 7 is an elevational view of the completed container;

FIG. 8 is a top plan view of the container, illustrating the handle in its locked position; and FIG. 9 is a fragmentary elevational view of the container also illustrating the container in its locked position.

Figure 1:
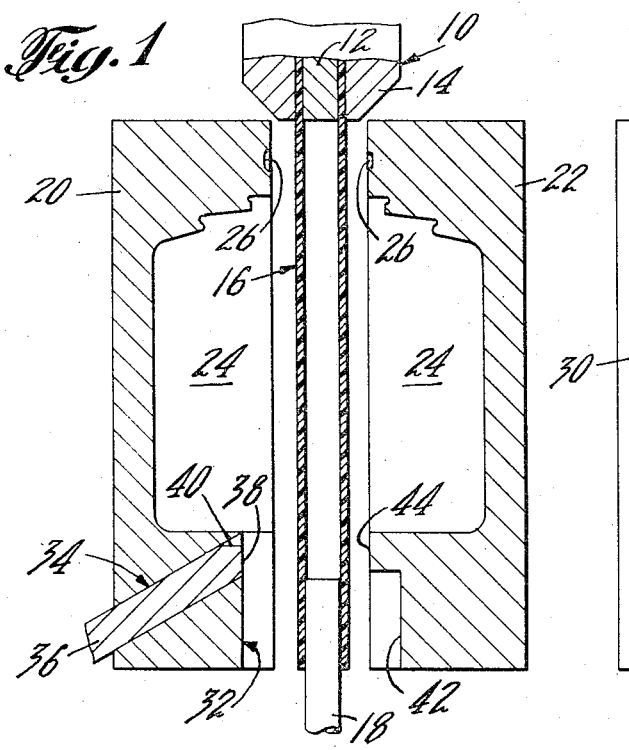
FIG. 1 is a vertical sectional view of an extrusion head, two mold halves and a parison, illustrating the relative positions therebetween immediately before the molds are closed.

As a preferred or exemplary embodiment of the instant method, the drawings illustrate an extrusion head generally designated 10. The extrusion head 10 comprises a central core 12 and a die 14 which cooperate to form a passage therebetween. Thermoplastic material is discharged between the core 12 and the die 14 to form a hollow parison 16, which extends downwardly and terminates at the upper end of a blow pipe 18. The blow pipe 18 is employed to supply air to the interior of the parison 16 for the purpose of inflating, shaping, and cooling the parison as will be explained in detail hereinafter. However, other means of pressurizing the parison 16 may be employed, such as needle blowing as disclosed in U.S. Patent No. 2,579,390. Any known support means may be employed to support the blow pipe 18.

A pair of mold halves 20 and 22 is located immediately below the extrusion head 10. The mold halves 20 and 22 may be supported and reciprocated by any of the known mold support and actuation apparatus (not shown). The mold halves 20 and 22 are each provided with a cavity, which, when the mold halves are in their closed positions cooperate to form a body-forming cavity 24 and a handle-forming cavity 26 which which the parison is formed. Each mold half presents a cavity which is substantially the mirror image of the cavity formed within the other mold half. The mold half 20 shown in FIG. 2 will be discussed in detail and it will therefore be understood that the container-forming cavity of the remaining mold 22 is the mirror image thereof, except for the minor details which will be specifically discussed in detail hereinafter.

The face of mold half 20 is provided with two polished surfaces which includes a first generally rectangular surface 28 located within and merging with the handle-forming cavity 26 and a larger surface 30. The larger surface 30 circumscribes the peripheries of the handle-forming cavity 28 and the container-forming cavity 24. The larger polished surface 30 terminates along a vertically extending passage 32 and a rectangular passage 34. The passage 32 provides a recess within which the upper end of the blow pipe 18 extends when the molds are closed. The rectangular passage 34 extends through the mold half 20 and terminates at the upper extremity of the passage 32. A ram 36 of generally rectangular cross-section is located within the rectangular passage 34 and reciprocated therewithin such as by a pneumatic or hydraulic actuation means (not shown). To facilitate blowing of the parison 16 and to provide the desired cavity configuration when the molds are closed, the upper end of the ram 36 is provided with a rectangular, vertically disposed wall 38 and a flat, rectangular, horizontally positioned wall 40. The vertical wall 38 and the horizontal wall 40 of the ram intersect to form a right angle thereat.

Figure 3:
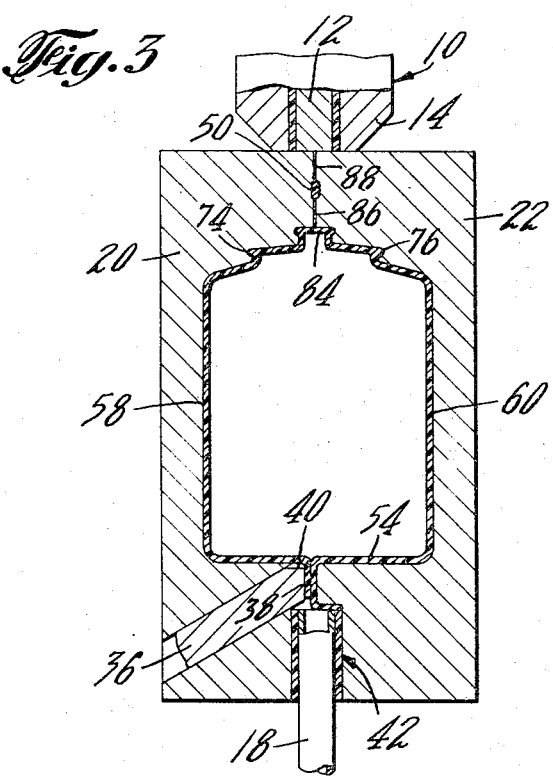
FIG. 3 is a vertical sectional view of the extrusion head, the two mold halves and the finished article, illustrating the cross-section of the formed article after inflation and closing of the parison.
Figure 4:
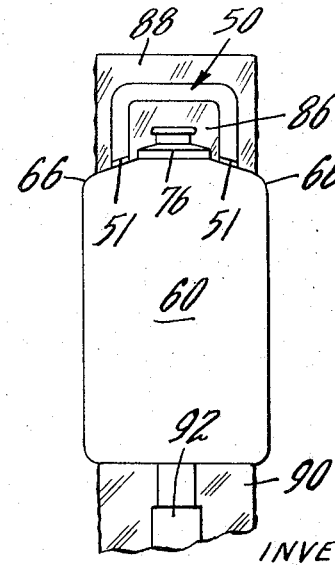
FIG. 4 is an elevational view of the article after its removal from the mold.

The above-described apparatus effects the manufacture of a closed hollow article in the following manner. While the mold halves 20 and 22 are maintained radially outwardly of the parison 16, a hollow parison 16 of the illustrated length is periodically extruded from the extrusion head 10. Extrusion is terminated as the leading edge of the hollow parison 16 envelopes the blow pipe 18, whereupon the mold halves 20 and 22 are moved to the closed position as shown in FIG. 3.

While the mold halves 20 and 22 are closed, the lower end of the hollow parison 16 is compressed and sealed between the blow pipe 18 and the adjacent surfaces of the mold halves 20 and 22. To effect this seal, the mold 22 is provided with a semi-cylindrical surface 42, which cooperates with the semi-cylindrical surface 32 of the mold half 20 to compress and seal the lower extremity of the parison 16.

Additionally, the mold halves 20 and 22 must insure communication between the blow pipe 18 and the parison 16 during the blowing of the parison and subsequent thereto the mold halves and the ram 36 must effect a heat sealing operation at the lower end of the parison. For this reason, the mold halves 20 and 22 are unsymmetrical above the semi-cylindrical surfaces 32 and 42, respectively. The lower face of the mold half 22 includes a flat face 44 which extends approximately along the axis of the blow pipe 18. When the ram 36 is positioned in its retracted position, the vertically disposed surface 38 thereon, the flat face 44 of the mold half 22 and the inner extremity of the rectangular passage 34 form a vertically extending rectangular passage through which the hollow parison 16 extends. The previously discussed compression of the lower end of parison 16 between the blow pipe 18 and the cylindrical mold surfaces 32 and 42 assists in maintaining the lower end of the parison in an open position along this vertically extending rectangular passage.

Figure 2:
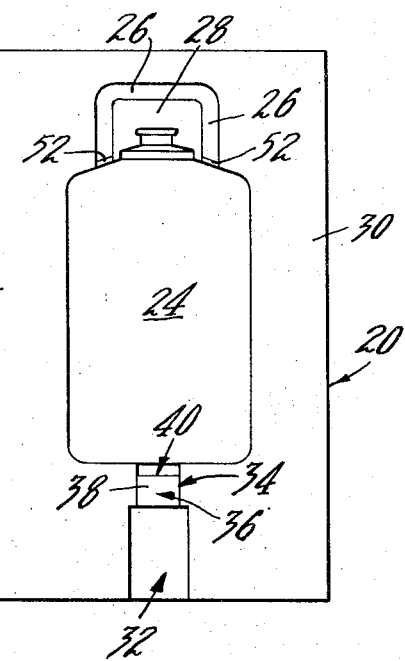
FIG. 2 is an elevational view of the left mold half, illustrating the container-forming cavities therein.

While the mold halves are closed, the upper end of the parison 16 is pinched-off and sealed by the upper surfaces of the mold halves 20 and 22. If desired, knife severance of the parison may be employed. After pinching, the upper end of the parison 16 is compressed between the opposed surfaces of the mold halves 20 and 22. This compression of the parison causes the thermoplastic material to flow into the U-shaped handle-forming cavity 26 to form a carrying handle 50. The cross-sectional area of the carrying handle 50 is reduced at its extremities 51 (FIG. 7) by projecting surfaces 52 located within the handle-forming cavity of each mold half. FIG. 2 illustrates the projecting surface 52 of mold half 20, which, cooperates with similar projection (not shown) in the handle-forming cavity 26 of mold half 22 to compress and reduce the cross-sectional area of the carrying handle 50 for reasons which will be more fully explained hereinafter.

After the mold halves 20 and 22 are moved to the closed position and while the ram 36 is retracted, pressurized fluid, preferably high-pressure air, at approximately 75 p.s.i. is supplied to the blow pipe 18 by any well-known valve means (not shown). The high pressure air causes the parison 16 to expand against the walls of the body-forming cavity 24 as shown in FIG. 3. Additionally, the air causes the expanded parison to cool. The mold halves 20 and 22 may be provided with cooling passages and a circulated coolant therewithin to reduce the cooling cycle of the formed parison.

During the expansion of the parison, the container body-forming cavity 24 effects the formation of a tubular container body which is closed at both ends except for an air inlet passage between the blow pipe 18 and the body-forming cavity. The walls of the container body-forming cavity 24 provide a mold for the formation of the container construction of the type illustrated in FIGS. 5 to 9. These walls integrally form an open rectangular flat bottom 54, a closed top, generally designated 56, and four rectangularly-shaped walls 58, 60, 62 and 64. The vertically positioned extremities of the walls 58, 60, 62 and 64 are preferably curved as shown at 66. The closed top 56 comprises a generally flat peripheral wall 68 which merges with the four rectangular walls 58, 60, 62 and 64. The peripheral wall 68 merges, at two equally spaced radial locations, with the lower extremities 51 of the U-shaped carrying handle 50. A locking ledge, generally designated 70 is located radially inwardly of the peripheral wall 68. The locking ledge 70 includes a panel 72 and four depending vertical walls 74, 76, 78 and 80 which merge with the peripheral panel 68 adjacent its inner end. The cross-sections of walls 74 and 76 are arcuate in a vertical direction to provide a locking surface for the carrying handle 50. The remaining sections 78 and 80 are preferably straight to allow uninterrupted movement of the carrying handle 50. The inner perimeter of the locking ledge merges with a closed cylindrical neck which includes a cylindrical portion 81, an arcuate angularly extending portion 82 located adjacent to the upper end of the cylindrical portion and a flat disc 84 which is subsequently removed to form a passage as will be explained more fully hereinafter.

Upon the completion of the container body formation, the ram 36 is moved to the extended position (FIG. 3) thereby closing the lower end of the formed container body and simultaneously locating the surfaces 38 and 40 of the ram 36 in a substantially parallel disposition relative to the adjoining surfaces of the mold half 20. Thus, the vertically disposed wall 38 of the ram is moved parallel to the polished surface 30 in which position the parison 16 is closed, compressed, and heat sealed between the vertically disposed wall 38 of the ram and the polished surface 44 of the mold 22. In the extended position, the horizontal wall 40 of ram 36 is positioned approximately coplanar with the container-forming surface of mold half 20 to provide a strong, heat sealed joint above the blow pipe 18.

Immediately after the heat seal is completed, the ram 36 is retracted to the position in FIG. 1, after which the mold halves 20 and 22 are re-opened and the formed article is removed from the mold half which retains the formed article. The previously discussed compression of the upper end of the parison 16 forms, in addition to the handle 50, a film of thermoplastic material 86 and 88 which is commonly referred to as "flash." The lower end of the parison is compressed between the blow pipe 18 and the mold halves 20 and 22. This compression also forms a rectangularly shaped flash film 90 and a hollow cylindrically shaped flash 92 depending therefrom.

To form a container from the closed article, the flash 86, 88 and 90 must be removed, and additionally the flat disc 84 must be provided with an aperture to serve as a filling and dispensing passage. FIG. 5 illustrates, schematically, the various container-forming steps to which the formed article is subjected for this purpose. The formed articles are placed in aligned relation and moved through a flash-removing operation represented by box 94. During this operation, the flash sections 86, 88 and 90 are removed by any of the conventional flash-trimming methods or apparatus to eliminate all connection between the U-shaped handle 50 and the container body, except the connections between the handle extremities 51 and the peripheral panel 68. The flash 90 is simultaneously removed from the wall 54.

The handle is forced to its locked position under the locking ledge 70 by an arm 95 before the container is moved to a boring or reaming operation represented by box 96. During the reaming or boring operation a filling and dispensing aperture 98 is formed in the neck of the container.

FIG. 6 shows the top view of the completed container with the flash removed and the neck of the container apertured as shown at 98. FIG. 7 shows a vertical plan view of the finished container.

As previously discussed, the mold cavities 52 provide reduced cross-sections 51 at the extremities of the carrying handle 50. The extremities 51 are equally spaced from the axis of the container body to facilitate handling of and dispensing from the container. Additionally, the reduced cross-sectional area of the extremities 51 provide an axis of rotation for the carrying handle, or, in effect, a hinge which greatly facilitates the rotation of the carrying handle 50.

FIG. 8 shows a plan view of the top of the container, illustrating the carrying handle 50 in a locked position. In its locked position, the handle 50 is in frictional engagement with arcuate surface 76. In this position, the upper extremity of the arcuate surface 76 extends beyond the inner perimeter of the handle 50 as shown in FIG. 8 by the dotted line 100. This disposition between the handle 50 and the arcuate wall 76 provides an interference fit therebetween and insures maintenance of the handle 50 in a locked position as illustrated in FIGS. 8 and 9. It will be noted that both short sides of the locking ledge 70 are provided with arcuate surfaces. These arcuate surfaces 74 and 76 are equally spaced from the rotational axis of the handle to facilitate locking of the carrying handle 50 along either of the opposed arcuate surfaces.

During filling of the container, the carrying handle 50 is located below either of the arcuate surfaces 74 or 76 to prevent, as much as possible, any interference with the filling operation. The carrying handle 50 is readily positioned to a dispensing or pouring position by positioning a finger or fingernail below the handle, along the arcuate surface 76, and lifting the handle thereat. As the handle 50 is moved along the arcuate surface 76, the upper radial extremity of the arcuate wall is displaced slightly inwardly to allow movement of the carrying handle 50 from the locked position to the carrying or dispensing position.

After filling the container through the aperture 98, the container may be closed by any well-known cap. An example thereof is a cap which comprises a circular disc and a depending cylindrical skirt which provides an interference fit with the annular lip 82 of the container neck. Another example is a disc-like cap attached to the top of the container by spin welding. Additionally, the mold halves 20 and 22 could be provided with screwthread profiles which would allow attachment of a screwthreaded closure cap to the neck of the container.

While the arcuate surfaces 74 and 76 are disclosed for the sole purpose of retaining the carrying handle 50 in position, it is to be understood that the surfaces afford additional utility. Because of the rigidity of the upper portion of the container, i.e. the lower ratio results in thicker walls, the grooves defined by the surfaces 74, 76 provide an excellent location for grasping and supporting the blown container with automatic tooling for any desired operation, e.g. transfer, filling or container-forming operations discussed above in which the flash 86, 88 and 90 is removed. If such employment of the arcuate surfaces 74 and 76 is made and a locking surface is desired, one or both of the mold halves 20 and 22 may be provided with an auxiliary arcuate recess located above the illustrated arcuate recess 74, 76, which auxiliary recess would be formed during blow-molding of the parison into the container.

It is thought that the invention and many of its attendant advantages will be understood from the foregoing description and it will be apparent that various changes may be made in the article and in the steps of the method described and their order of accomplishment without departing from the spirit and scope of the invention or sacrificing any of its material advantages, the method and apparatus hereinbefore described being merely a preferred embodiment thereof.

I claim:
1. A one-piece blow molded plastic container comprising:
   a hollow tubular body;
   an imperforate bottom wall integral with and closing one end of said body;
   a top wall integral with and substantially closing the opposite end of said body, said top wall having a restricted filling and dispensing opening centrally located therein;
   said top wall comprising a smaller central panel in which is located said centrally disposed opening, a peripheral wall depending from the periphery of said smaller panel and a larger panel extending outwardly from the lower periphery of said peripheral wall and merging with the side wall of said body;
   a solid plastic carrying handle for said container generally in the shape of an inverted U with the end only of the legs thereof integral with said top wall on each side of said opening, said legs at their juncture with said top wall having a reduced thickness to provide ready oscillation of the free end of said handle about said juncture; and
   a locking means integral with said top wall and spaced from said opening in the direction of oscillation of said free end to frictionally retain said free end in one oscillated poistion away from said opening.
2. The container set forth in claim 1 wherein said locking means comprises an upper margin of said peripheral wall, said margins being spaced from said opening, in the direction of handle oscillation a distance slightly greater than the distance which the midpoint of said handle is spaced from said opening whereby, upon full oscillation of said handle midpoint toward said margin, said midpoint snaps under and is frictionally retained in full oscillated position by said margin.

References Cited
UNITED STATES PATENTS

| | | | |
|---|---|---|---|
| 2,882,388 | 4/1959 | Garland. | |
| 2,895,654 | 7/1959 | Rieke. | |
| 3,119,541 | 1/1964 | Lynn. | |
| 3,100,576 | 8/1963 | Frank | 215—1 |
| 3,168,207 | 2/1965 | Noland | 215—1 |
| 3,164,646 | 1/1965 | Fischer | 264—98 |
| 3,197,532 | 7/1965 | Maass | 264—98 |
| 2,652,054 | 9/1953 | Bishop. | |
| 2,982,434 | 5/1961 | Hidding | 215—100 |
| 3,285,454 | 11/1966 | Bailey | 215—100 |

FOREIGN PATENTS

| | | |
|---|---|---|
| 11,637 | 9/1888 | Great Britain. |
| 770,847 | 3/1957 | Great Britain. |

DONALD F. NORTON, *Primary Examiner.*

JOSEPH R. LECLAIR, *Examiner.*